(12) United States Patent
Janssen et al.

(10) Patent No.: US 12,241,189 B2
(45) Date of Patent: Mar. 4, 2025

(54) METHOD AND DEVICE FOR DEPOSITING A FIBER MATERIAL LAYER ON A CARRIER

(71) Applicant: Vivolta B.V., Waalre (NL)

(72) Inventors: Paul Johannes Franciscus Maria Janssen, Eindhoven (NL); Ramon Hubertus Mathijs Solberg, Munstergeleen (NL)

(73) Assignee: Vivolta B.V., Waalre (NL)

( * ) Notice: Subject to any disclaimer, the term of this patent is extended or adjusted under 35 U.S.C. 154(b) by 333 days.

(21) Appl. No.: 17/606,797

(22) PCT Filed: Apr. 30, 2020

(86) PCT No.: PCT/NL2020/050272
§ 371 (c)(1),
(2) Date: Oct. 27, 2021

(87) PCT Pub. No.: WO2020/226488
PCT Pub. Date: Nov. 12, 2020

(65) Prior Publication Data
US 2022/0205155 A1   Jun. 30, 2022

(30) Foreign Application Priority Data

May 8, 2019  (NL) ...................................... 2023085

(51) Int. Cl.
*D04H 1/72* (2012.01)
*D04H 1/736* (2012.01)
(Continued)

(52) U.S. Cl.
CPC ........ *D04H 1/736* (2013.01); *H01M 10/0525* (2013.01); *H01M 50/403* (2021.01); *H01M 50/406* (2021.01); *H01M 50/44* (2021.01)

(58) Field of Classification Search
None
See application file for complete search history.

(56) References Cited

U.S. PATENT DOCUMENTS

| 2008/0018012 | A1* | 1/2008 | Lemaire | .................. | D01F 9/133 |
| | | | | | 425/75 |
| 2011/0155295 | A1* | 6/2011 | Fan | ....................... | C01B 32/168 |
| | | | | | 156/60 |

(Continued)

FOREIGN PATENT DOCUMENTS

| CN | 103545462 A | 1/2014 |
| WO | 2012/050682 | 4/2012 |

(Continued)

*Primary Examiner* — Austin Murata
(74) *Attorney, Agent, or Firm* — N.V. Nederlandsch Octrooibureau

(57) ABSTRACT

Method and device for depositing a fiber material layer on a carrier, such as using an electrospinning process. The device includes a deposition unit positioned remote from the carrier during operation, and the deposition unit is arranged for forming the fiber material layer on the carrier in a continuous manner A carrier feed unit is provided for feeding the carrier in a transport direction with a predetermined speed, and the carrier includes a plurality of carrier plates. A cutting unit is present and arranged downstream from the deposition unit, the cutting unit being arranged to cut the deposited fiber material layer in between two adjacent ones of the plurality of carrier plates.

25 Claims, 2 Drawing Sheets

(51) Int. Cl.
    *H01M 10/0525*     (2010.01)
    *H01M 50/403*     (2021.01)
    *H01M 50/406*     (2021.01)
    *H01M 50/44*     (2021.01)

(56) References Cited

U.S. PATENT DOCUMENTS

2014/0014918 A1    1/2014  Han
2019/0320565 A1*  10/2019  Luo ...................... H05K 1/0268

FOREIGN PATENT DOCUMENTS

| WO | 2013/050088 | 4/2013 |
| WO | 2019/052881 | 3/2019 |

* cited by examiner

METHOD AND DEVICE FOR DEPOSITING A FIBER MATERIAL LAYER ON A CARRIER

FIELD OF THE INVENTION

The present invention relates, in a first aspect to a method for depositing a fiber material layer on a carrier, the method comprising feeding the carrier in a transport direction with a predetermined speed, and forming the fiber material layer on the carrier in a continuous manner, the carrier moving in the transport direction. In a second aspect, the present invention relates to a device for depositing a fiber material layer on a carrier, the device comprising a deposition unit positioned remote from the carrier during operation, the deposition unit being arranged for forming the fiber material layer on the carrier in a continuous manner.

BACKGROUND ART

International patent publication WO2012/050682 discloses an electrospinning method for forming an integrated separator for lithium-ion batteries, using roll-to-roll processing of a carrier substrate. The separator is made of a porous electro-spun polymer material and has a nanofiber backbone structure.

SUMMARY OF THE INVENTION

The present invention seeks to provide an improved method and device for providing a fiber material layer, allowing reliable and large scale production of the fiber material layer.

According to the present invention, a method as defined above is provided, wherein the carrier comprises a plurality of carrier plates, and the method further comprises cutting the deposited fiber material layer in between two adjacent ones of the plurality of carrier plates. In a further aspect, a device as defined above is provided, the device further comprising a carrier feed unit for feeding the carrier in a transport direction with a predetermined speed, wherein the carrier comprises a plurality of carrier plates, and a cutting unit arranged downstream from the deposition unit, the cutting unit being arranged to cut the deposited fiber material layer in between two adjacent ones of the plurality of carrier plates. The present invention embodiments allow to post-process the fiber material layers on individual carrier plates, e.g. by stacking the individual carrier plates. This in turn allows to keep the fiber material layers unaffected, without compression and with the possibility to allow outgassing (i.e. evaporation of remaining solvents) in a sufficient manner.

SHORT DESCRIPTION OF DRAWINGS

Figure 1:
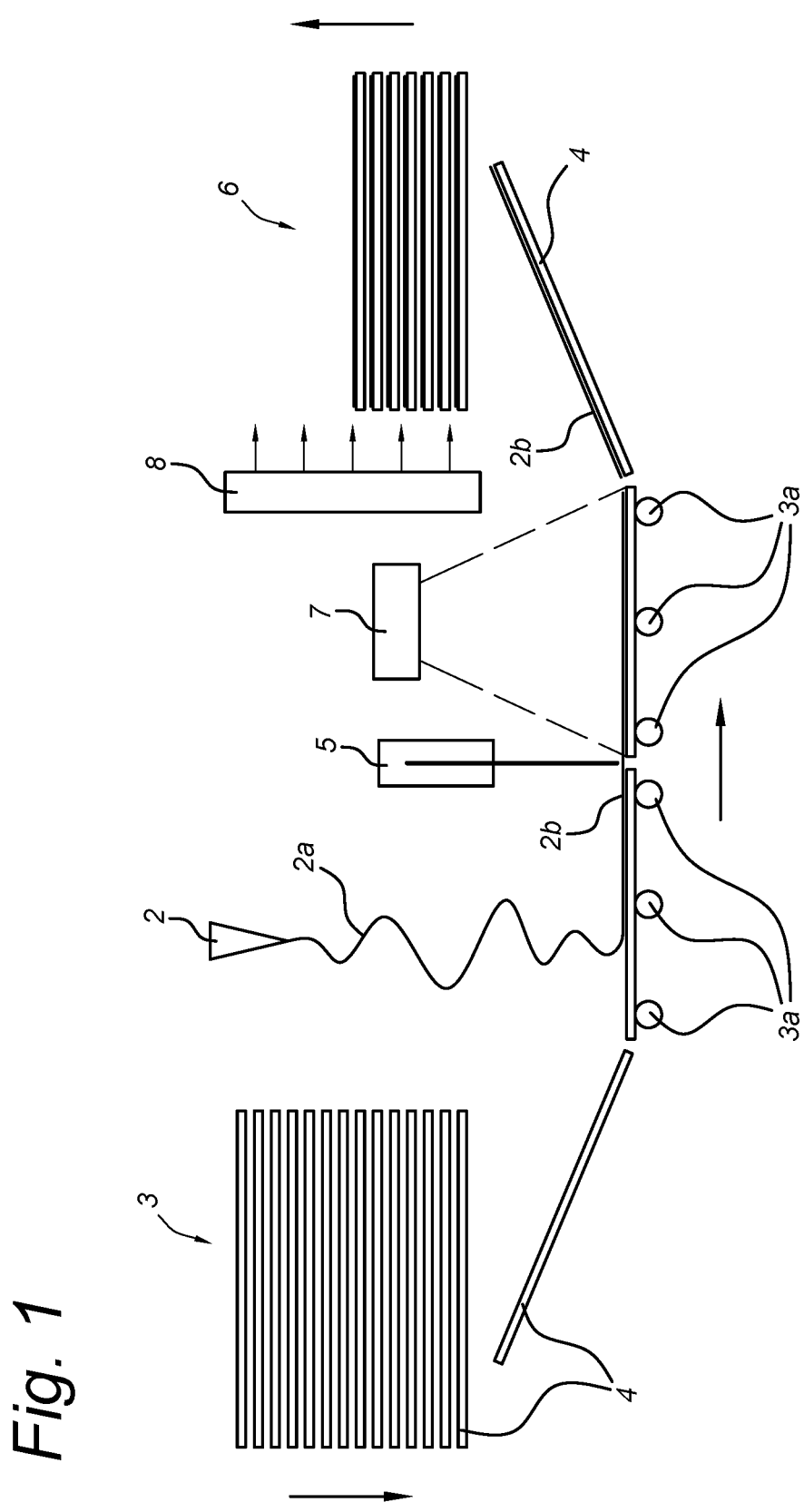
Figure 2:
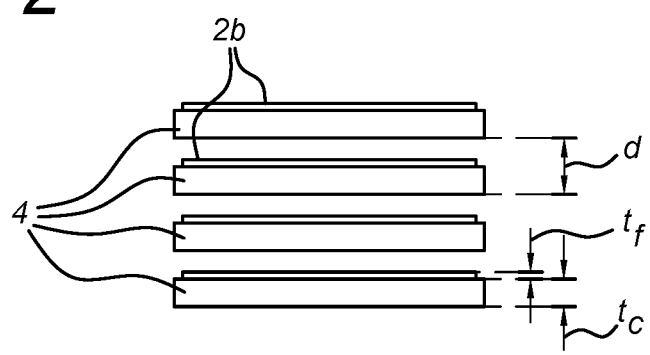
Figure 3:
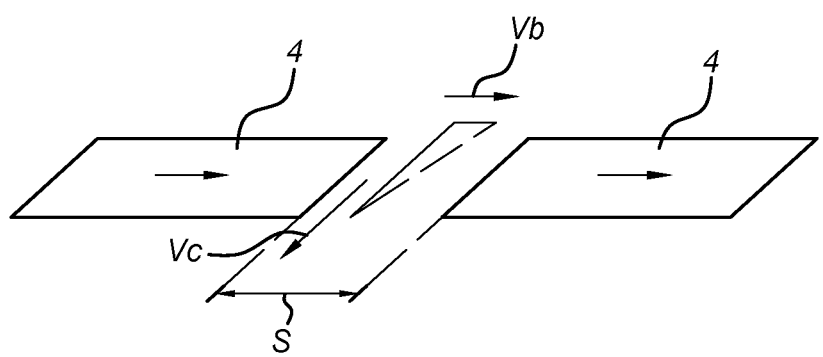

The present invention will be discussed in more detail below, with reference to the attached drawings, in which FIG. 1 shows a schematic diagram of a device for depositing a fiber material layer on a carrier according to an embodiment of the present invention;

FIG. 2 shows a detailed view of a stack of carrier plates as applied in the device embodiment of FIG. 1; and FIG. 3 shows a perspective view of two adjacent carrier plates subjected to a cutting step.

DESCRIPTION OF EMBODIMENTS

The present invention relates to a method and device for depositing a fiber material layer on a carrier in a generic sense, allowing to be used in large scale fiber material deposition processes to enhance the (fiber) product reproducibility and improved automation of such processes. Examples of the deposition techniques wherein the present invention embodiments may be advantageously applied are electrospinning, electro-spraying and melt-printing (e.g. a melt electro writing (MEW) process).

Bulk production of fibers into a flat 'matt' structure is e.g. done by spinning onto a roll-to-roll carrier as a continuous process. Roll-to-roll carriers however have some drawbacks when it comes to maintaining the integrity of the produced fibrous structures. The collection of the freshly spun fibers onto a roll causes the fibers to become compressed between successive layers on the roll which can cause unwanted deformation of the mesh structure. The compression also causes the fibrous layer to attach to the successive carrier layer, which causes damage of the structure at the unwinding of the roll. Moreover, rolling up successive layers causes suffocation of the evaporation of the remaining solvent inside the freshly spun fibers. This results in an uneven drying course inside the fiber matt and may cause unwanted (severe) morphology changes of the fibers and mesh structure. Finally, the collection of freshly spun fibers onto a roll also causes the matt to set in a bended form which may cause bulging or wrinkling of the matt when flattened later, which can be very undesirable in post-processing steps.

In the present invention method and device embodiments, the rolls are replaced by a feed of individual carrier plates 4, e.g. by means of a sheet or plate feeder and sheet or plate collector. The process applied is e.g. electro-spinning wherein a fiber 2a is spun onto the carrier plates 4 in a continuous fashion and as such, creates an endless fiber matt or fiber material layer 2b. Directly after the spinning process the endless fiber matt is cut between successive carrier plates 4 to enable the separation of the carrier plates 4 with fiber material layer 2b and to prevent any stress in the fiber material layer 2b due to the further handling of the carrier plates 4.

An exemplary embodiment of a device according to the present invention is shown schematically in FIG. 1. A carrier feed unit 3 is provided, which holds a stack of carrier plates 4, and is arranged for feeding a (generic) carrier in a transport direction (shown with the arrow in the drawing) with a predetermined speed $v_b$. The carrier comprises a plurality or sequence of (adjacent) carrier plates 4. As shown in this exemplary embodiment, the individual carrier plates 4 are transported using rollers 3a, which may be controlled to keep the predetermined speed $v_b$ and a distance s between adjacent carrier plates 4 (see also FIG. 3 discussed below) constant. As an alternative to rollers 3a, e.g. a conveyor belt or sprocket wheels may be used.

A deposition unit 2 is shown schematically in FIG. 1, which in this exemplary embodiment is an electrospinning assembly which during operation provides a single endless fiber 2a onto a target, i.e. the carrier plates 4 as shown, thus forming the fiber material layer 2b. Furthermore, a cutting unit 5 is present, which is arranged to cut through the fiber material layer 2b in order to obtain individual carrier plates 4 with a fiber material layer 2b on top of it.

In the FIG. 1 exemplary embodiment, further (optional) units are present, such as an inspection unit 7, a drying unit 8 and a stacking unit 6, the functioning of which will be explained below referring to further embodiments of the present invention.

In a generic embodiment, the present invention relates to a device for depositing a fiber material layer on a carrier, the device comprising a deposition unit 2 positioned remote from (e.g. above as indicated in the FIG. 1 embodiment, but deposition can also be from below) the carrier during operation, the deposition unit 2 being arranged for forming the fiber material layer 2b layer on the carrier in a continuous manner. A carrier feed unit 3 is provided for feeding the carrier in a transport direction with a predetermined speed $v_b$, wherein the carrier comprises a plurality of carrier plates 4. A cutting unit 5 is arranged downstream from the deposition unit 2, the cutting unit 5 being arranged to cut the deposited fiber material layer 2b in between two adjacent ones of the plurality of carrier plates 4. In an even more generic sense, the present invention relates to a method for depositing a fiber material layer on a carrier, the method comprising feeding the carrier in a transport direction with a predetermined speed, forming the fiber material layer on the carrier in a continuous manner, the carrier moving in the transport direction, wherein the carrier comprises a plurality of carrier plates 4. The method further comprises cutting the deposited fiber material layer in between two adjacent ones of the plurality of carrier plates 4. It is noted that using this method, or operating this device, a fiber material layer 2b (e.g. a layer of electro-spun material) is deposited onto the plurality of carrier plates 4, wherein the fiber material layer 2b has a predetermined lateral strength in the transport direction (before being cut). All present invention embodiments provide the advantage that the individual carrier plates 4 with fiber material layer 2b can be processed further individually, such that no bending or suffocation of the freshly formed fiber material layer 2b occurs, easy drying can be provided, and more easy outgassing of solvents, etc. can be accomplished.

In a further embodiment, the device further comprises a stacking unit 6 positioned downstream from the cutting unit 5, the stacking unit 6 being arranged to stack adjacent ones of the plurality of carrier plates 4. In analogy, the present invention method embodiments may further comprise stacking adjacent ones of the plurality of carrier plates 4 after the cutting. This allows to provide a compact, small footprint device, and by properly controlling both the carrier feed unit 3 and the stacking unit 6, it is possible to cater for timing variations in further processing steps of the individual carrier plates 4 (e.g. drying, see below).

This can even be enhanced at the input side of the device by adding a further optional feature, wherein the carrier feed unit 3 comprises a de-stacking unit, the de-stacking unit being arranged for taking a carrier plate 4 from a stack of carrier plates 4 and forming the plurality of carrier plates 4. De-stacking units as such are well known to the person skilled in the art in various implementation schemes, and can be adapted to specifically suit the dimensions of the carrier plates 4 as used in the present invention embodiments. In an associated method embodiment, feeding the carrier comprises taking a carrier plate 4 from a stack of carrier plates 4 and forming the plurality of carrier plates 4. In addition to providing an efficient, compact, small footprint device on the input side, it is noted that in the end it would be possible that the stack of carrier plates 4 can be re-used after e.g. removing the individual fiber material layers 2b and cleaning the carrier plates 4.

As shown in more detail in the cross-sectional view in FIG. 2 of a stack of carrier plates 4 provided with a fiber material layer 2b (in the stacking unit 6), the carrier plates 4 can be stacked with an inter-stack distance d. By stacking the carrier plates 4 coated with fiber material layer 2b in a separated manner with distance d, it is ensured that the fiber material layer 2b cannot be compressed, suffocated and/or induced by bending stresses.

This is further ensured in a further method embodiment, further comprising stacking adjacent ones of the plurality of carrier plates 4 with an inter-stack distance d, the inter-stack distance d being larger than the sum of a thickness $t_c$ of an individual carrier plate 4 plus a thickness $t_f$ of the fiber material layer 2b. The inter-stack distance d will provide space between carrier plates 4 to allow drying/outgassing/ etc. of the fiber material layer 2b. Stacking the carrier plates 4 in a separated manner also creates (in a small footprint) a sort of drying 'tunnel', and, additionally or alternatively, can also provide a buffer from which the carrier plates 4 can be fed into an automated post-processing scheme.

In a further embodiment, cutting is performed using a mechanical cutting method, e.g. using moving knives or razor blades. Alternatively, cutting is performed using a contactless cutting method. An example thereof is a material ablation cutting technique, such as laser cutting. In an even further alternative, abrasive cutting methods may be applied, such as waterjet cutting.

As the cutting must be performed between successive moving carrier plates 4 during operation of the device (which cannot be periodically stopped), the cutting unit 5 follows the plate speed $v_b$ during the cut with cutting speed $v_c$. This can e.g. be accomplished by implementing a "flying saw" approach where the cutting unit 5 (more specifically an actual cutting element of the cutting unit 5) moves along with the carrier plates 4 in a synchronized way during the cut. This is shown schematically in FIG. 3.

In an embodiment of the present invention, the plurality of carrier plates 4 comprise a rigid (or stiff) material, e.g. a metal. This allows easy, proper and reliable handling of the individual (and sequence) of carrier plates 4, such as during (de-)stacking.

Using rigid individual carrier plates 4 also enables improved inline quality control steps, such as thickness measurement of the individual (e.g. electrospun) fiber material layer 2b. In a further device embodiment, to this end, the device further comprises an inspection unit 7 positioned downstream from the cutting unit 5, the inspection unit 7 being arranged for inspecting the fiber material layer 2b on individual ones of the plurality of carrier plates 4.

In the associated method embodiment, the method further comprises inspecting the fiber material layer 2b on individual ones of the plurality of carrier plates 4 after the cutting. In a first alternative, inspecting comprises a thickness measurement. If the individual carrier plate 4 thickness $t_c$ is known, allows to perform a precise measurement of the thickness $t_c$ of the fiber material layer 2b thereon, e.g. using laser distance measurement. Additionally or alternatively, inspecting comprises image analysis. Using this embodiment can be applied e.g. for detecting mesh defects in the fiber material layer 2b. The inspection measurements can be even further enhanced if, according to a further embodiment, individual ones of the plurality of the carrier plates 4 comprise individual identification codes, e.g. a readable, bar or QR code. In this manner, each carrier plate 4 can have a specific ID code in combination with pre-identified carrier thickness $t_c$ information. Subtracting the exact carrier thickness $t_c$ on the measurement location makes a precise determination of the thickness $t_f$ of the fiber material layer 2b possible. It is noted that these type of inspection steps are very hard to achieve in a roll-to-roll situation of depositing a fiber material layer on a carrier.

The carrier plates 4 can also have specific features especially adapted for production and/or post processing of the fiber material layer 2b. In one embodiment, the plurality of carrier plates 4 comprise a predetermined pattern, e.g.

etched, coated or metallic patterns, which e.g. allows to collect fibers in specific directions. In a further embodiment, the plurality of carrier plates 4 comprise a surface which is compatible with post-processing of the fiber material layer 2b. The surface of each carrier plate 4 can e.g. be of a material insensitive to post-processing, or have a coating or surface finish which is compatible with the post-processing. Compatible with the post-processing is to be understood broadly, and includes being inert to, or resistant/insensitive to post-processing techniques. The post-processing e.g. comprises using a laser cutting technique to obtain specific geometries out of the fiber material layer 2b on the surface of the carrier plates 4. In an even further embodiment, the plurality of carrier plates 4 comprise a surface layer, e.g. in the form of an anti-stick or Teflon layer, which allows to easily separate the fiber material layer 2b from the carrier plate 4. Alternatively or additionally, the carrier plates 4 are pre-treated, by e.g. smoothing of the surface.

Other examples of post-processing steps would be incorporated product handling, quality inspection, and/or scrap management (e.g. excluding a carrier plate 4 from stacking and/or post-processing when a mesh defect is detected in the fiber material layer 2b.

In a specific further embodiment, the method further comprises drying the plurality of carrier plates 4, e.g. after stacking the carrier plates. The device can accordingly further comprise a drying unit 8 positioned downstream from the cutting unit 5, the drying unit 8 being arranged to enhance drying of the fiber material layer 2b on individual ones of the plurality of carrier plates 4. As such, drying units for drying deposited material on a carrier plate are known to the person skilled in the art. The drying unit 20 can be arranged to be operative on a single carrier plate 4 (directly downstream of the cutting unit 5), or on a stack of carrier plates 4, such as when the stack is in the stacking unit 6 (see FIG. 1). Depending on the exact deposition process type and type of fiber material layers 2 being formed using the present invention embodiments, specific adaptations of the drying unit 8 can be implemented.

In the above, exemplary embodiments of the present invention have been described with reference to the drawings, which may also be described by the following numbered and interrelated embodiments.

Embodiment 1. Method for depositing a fiber material layer (2b) on a carrier, the method comprising
  feeding the carrier in a transport direction with a predetermined speed,
  forming the fiber material layer (2b) on the carrier in a continuous manner, the carrier moving in the transport direction,
  wherein the carrier comprises a plurality of carrier plates (4), and the method further comprises
  cutting the deposited fiber material layer (2b) in between two adjacent ones of the plurality of carrier plates (4).

Embodiment 2. Method according to embodiment 1, further comprising stacking adjacent ones of the plurality of carrier plates (4) after the cutting.

Embodiment 3. Method according to embodiment 2, further comprising stacking adjacent ones of the plurality of carrier plates (4) with an inter-stack distance (d), the inter-stack distance (d) being larger than the sum of a thickness (tc) of an individual carrier plate (4) plus a thickness (tf) of the fiber material layer (2b).

Embodiment 4. Method according to any one of embodiments 1-3, wherein feeding the carrier comprises taking a carrier plate (4) from a stack of carrier plates (4) and forming the plurality of carrier plates (4).

Embodiment 5. Method according to any one of embodiments 1-4, wherein cutting is performed using a mechanical cutting method.

Embodiment 6. Method according to any one of embodiments 1-4, wherein cutting is performed using a contactless cutting method.

Embodiment 7. Method according to any one of embodiments 1-6, wherein the method further comprises inspecting the fiber material layer (2b) on individual ones of the plurality of carrier plates (4) after the cutting.

Embodiment 8. Method according to any one of embodiments 1-7, wherein inspecting comprises a thickness measurement.

Embodiment 9. Method according to any one of embodiments 1-7, wherein inspecting comprises image analysis.

Embodiment 10. Method according to any one of embodiments 1-9, wherein individual ones of the plurality of the carrier plates (4) comprise individual identification codes.

Embodiment 11. Method according to any one of embodiments 1-10, wherein the plurality of carrier plates (4) comprise a rigid material.

Embodiment 12. Method according to any one of embodiments 1-11, wherein the plurality of carrier plates (4) comprise a predetermined pattern.

Embodiment 13. Method according to any one of embodiments 1-12, wherein the plurality of carrier plates (4) comprise a surface which is compatible with post-processing of the fiber material layer (2b).

Embodiment 14. Method according to any one of embodiments 1-13, wherein the plurality of carrier plates (4) comprise a surface layer.

Embodiment 15. Method according to any one of embodiments 1-14, wherein the method further comprises drying the plurality of carrier plates (4).

Embodiment 16. Device for depositing a fiber material layer (2b) on a carrier, the device comprising
  a deposition unit (2) positioned remote from the carrier during operation, the deposition unit (2) being arranged for forming the fiber material layer (2b) on the carrier in a continuous manner,
  a carrier feed unit (3) for feeding the carrier in a transport direction with a predetermined speed (vb), wherein the carrier comprises a plurality of carrier plates (4), and
  a cutting unit (5) arranged downstream from the deposition unit (2), the cutting unit (5) being arranged to cut the deposited fiber material layer (2b) in between two adjacent ones of the plurality of carrier plates (4).

Embodiment 17. The device according to embodiment 16, further comprising
  a stacking unit (6) positioned downstream from the cutting unit (5), the stacking unit (6) being arranged to stack adjacent ones of the plurality of carrier plates (4).

Embodiment 18. The device according to embodiment 16 or 17, wherein the carrier feed unit (3) comprises a de-stacking unit, the de-stacking unit being arranged for taking a carrier plate (4) from a stack of carrier plates (4) and forming the plurality of carrier plates (4).

Embodiment 19. The device according to any one of embodiments 16-18, further comprising
  an inspection unit (7) positioned downstream from the cutting unit (5), the inspection unit (7) being arranged for inspecting the fiber material layer (2b) on individual ones of the plurality of carrier plates (4).

Embodiment 20. The device according to any one of embodiments 16-19, further comprising
  a drying unit (8) positioned downstream from the cutting unit (5), the drying unit (8) being arranged to enhance drying of the fiber material layer (2b) on individual ones of the plurality of carrier plates (4).

The present invention has been described above with reference to a number of exemplary embodiments as shown in the drawings. Modifications and alternative implementations of some parts or elements are possible, and are included in the scope of protection as defined in the appended claims.

The invention claimed is:

1. A device for depositing a fiber material layer on a carrier, the device comprising
   a deposition unit positioned remote from the carrier during operation, the deposition unit being arranged for forming the fiber material layer on the carrier in a continuous manner,
   a carrier feed unit for feeding the carrier in a transport direction with a predetermined speed, wherein the carrier comprises a plurality of carrier plates, and
   a cutting unit arranged downstream from the deposition unit, the cutting unit being arranged to cut the deposited fiber material layer in between two adjacent ones of the plurality of carrier plates to enable the separation of the carrier plates with the fiber material layer,
   wherein the deposition unit faces a surface of the carrier on which the fiber material layer is formed.

2. The device according to claim 1, further comprising
   a stacking unit positioned downstream from the cutting unit, the stacking unit being arranged to stack adjacent ones of the plurality of carrier plates.

3. The device according to claim 1, wherein the carrier feed unit comprises a de-stacking unit, the de-stacking unit being arranged for taking a carrier plate from a stack of carrier plates and forming the plurality of carrier plates.

4. The device according to claim 1, further comprising
   an inspection unit positioned downstream from the cutting unit, the inspection unit being arranged for inspecting the fiber material layer on individual ones of the plurality of carrier plates.

5. The device according to claim 4, wherein the inspection unit is configured to perform image analysis.

6. The device according to claim 1, wherein the cutting unit is configured to perform the cutting by means of a mechanical cutting method.

7. The device according to claim 1, wherein the cutting unit is configured to perform the cutting by means of a contactless cutting method.

8. The device according to claim 1, wherein individual ones of the plurality of the carrier plates comprise individual identification codes.

9. The device according to claim 1, wherein the plurality of carrier plates comprises a rigid material or a surface layer.

10. The device according to claim 1, wherein the plurality of carrier plates comprises a predetermined pattern.

11. The device according to claim 1, wherein the plurality of carrier plates comprises a surface which is compatible with post-processing of the fiber material layer.

12. The device according to claim 1, wherein the carrier feed unit is configured to feed the carrier with the predetermined speed while the deposition unit forms the fiber material layer on the carrier and while the cutting unit cuts the deposited fiber material layer in between the two adjacent ones of the plurality of carrier plates.

13. A device for depositing a fiber material layer on a carrier, the device comprising
   a deposition unit positioned remote from the carrier during operation, the deposition unit being arranged for forming the fiber material layer on the carrier in a continuous manner,
   a carrier feed unit for feeding the carrier in a transport direction with a predetermined speed, wherein the carrier comprises a plurality of carrier plates,
   a cutting unit arranged downstream from the deposition unit, the cutting unit being arranged to cut the deposited fiber material layer in between two adjacent ones of the plurality of carrier plates to enable the separation of the carrier plates with the fiber material layer, and
   a drying unit positioned downstream from the cutting unit, the drying unit being arranged to enhance drying of the fiber material layer on individual ones of the plurality of carrier plates.

14. A device for depositing a fiber material layer on a carrier, the device comprising
   a deposition unit positioned remote from the carrier during operation, the deposition unit being arranged for forming the fiber material layer on the carrier in a continuous manner,
   a carrier feed unit for feeding the carrier in a transport direction with a predetermined speed, wherein the carrier comprises a plurality of carrier plates,
   a cutting unit arranged downstream from the deposition unit, the cutting unit being arranged to cut the deposited fiber material layer in between two adjacent ones of the plurality of carrier plates to enable the separation of the carrier plates with the fiber material layer, and
   a stacking unit positioned downstream from the cutting unit, the stacking unit being arranged to stack adjacent ones of the plurality of carrier plates,
   wherein the stacking unit is configured to stack adjacent ones of the plurality of carrier plates with an inter-stack distance, the inter-stack distance being larger than the sum of a thickness of an individual carrier plate plus a thickness of the fiber material layer.

15. A device for depositing a fiber material layer on a carrier, the device comprising
   a deposition unit positioned remote from the carrier during operation, the deposition unit being arranged for forming the fiber material layer on the carrier in a continuous manner,
   a carrier feed unit for feeding the carrier in a transport direction with a predetermined speed, wherein the carrier comprises a plurality of carrier plates,
   a cutting unit arranged downstream from the deposition unit, the cutting unit being arranged to cut the deposited fiber material layer in between two adjacent ones of the plurality of carrier plates to enable the separation of the carrier plates with the fiber material layer, and
   an inspection unit positioned downstream from the cutting unit, the inspection unit being arranged for inspecting the fiber material layer on individual ones of the plurality of carrier plates,
   wherein the inspection unit is configured to perform a thickness measurement.

16. A device for depositing a fiber material layer on a carrier, the device comprising
   a deposition unit positioned remote from the carrier during operation, the deposition unit being arranged for forming the fiber material layer on the carrier in a continuous manner,
   a carrier feed unit for feeding the carrier in a transport direction with a predetermined speed, wherein the carrier comprises a plurality of carrier plates, and a cutting unit arranged downstream from the deposition unit, the cutting unit being arranged to cut the deposited fiber material layer in between two adjacent ones of the plurality of carrier plates to enable the separation of the carrier plates with the fiber material layer, wherein the cutting unit is configured to follow the predetermined speed of the moving carrier plates during the cut of the deposited fiber material layer.

17. A device for depositing a fiber material layer on a carrier, the device comprising
    a deposition unit positioned remote from the carrier during operation, the deposition unit being arranged for forming the fiber material layer on the carrier in a continuous manner,
    a carrier feed unit for feeding the carrier in a transport direction with a predetermined speed, wherein the carrier comprises a plurality of carrier plates, the transport direction is a linear direction, and the carrier feed unit is configured to feed the carrier in the linear direction, and
    a cutting unit arranged downstream from the deposition unit, the cutting unit being arranged to cut the deposited fiber material layer in between two adjacent ones of the plurality of carrier plates to enable the separation of the carrier plates with the fiber material layer.

18. A device for depositing a fiber material layer on a carrier, the device comprising
    a deposition unit positioned remote from the carrier during operation, the deposition unit being arranged for forming the fiber material layer on the carrier in a continuous manner,
    a carrier feed unit for feeding the carrier in a transport direction with a predetermined speed, wherein the carrier comprises a plurality of carrier plates, and
    a cutting unit arranged downstream from the deposition unit, the cutting unit being arranged to cut the deposited fiber material layer in between two adjacent ones of the plurality of carrier plates to enable the separation of the carrier plates with the fiber material layer,
    wherein the carrier feed unit further comprises a plurality of rollers, a conveyor belt, or a plurality of sprocket wheels.

19. A method for depositing a fiber material layer on a carrier, the method comprising
    providing a device for depositing a fiber material layer on a carrier, the device comprising:
        a deposition unit positioned remote from the carrier during operation, the deposition unit being arranged for forming the fiber material layer on the carrier in a continuous manner,
        a carrier feed unit for feeding the carrier in a transport direction with a predetermined speed, wherein the carrier comprises a plurality of carrier plates, and
        a cutting unit arranged downstream from the deposition unit, the cutting unit being arranged to cut the deposited fiber material layer in between two adjacent ones of the plurality of carrier plates to enable the separation of the carrier plates with the fiber material layer,
        wherein the deposition unit faces a surface of the carrier on which the fiber material layer is formed;
    feeding the carrier in a transport direction with a predetermined speed,
    forming the fiber material layer on the carrier in a continuous manner by the deposition unit that faces the surface of the carrier on which the fiber material layer is formed, the carrier moving in the transport direction, and
    cutting the deposited fiber material layer in between two adjacent ones of the plurality of carrier plates to enable the separation of the carrier plates with the fiber material layer.

20. A method for depositing a fiber material layer on a carrier, the method comprising
    providing a device for depositing a fiber material layer on a carrier, the device comprising:
        a deposition unit positioned remote from the carrier during operation, the deposition unit being arranged for forming the fiber material layer on the carrier in a continuous manner,
        a carrier feed unit for feeding the carrier in a transport direction with a predetermined speed, wherein the carrier comprises a plurality of carrier plates,
        a cutting unit arranged downstream from the deposition unit, the cutting unit being arranged to cut the deposited fiber material layer in between two adjacent ones of the plurality of carrier plates to enable the separation of the carrier plates with the fiber material layer, and
        a drying unit positioned downstream from the cutting unit, the drying unit being arranged to enhance drying of the fiber material layer on individual ones of the plurality of carrier plates;
    feeding the carrier in a transport direction with a predetermined speed,
    forming the fiber material layer on the carrier in a continuous manner, the carrier moving in the transport direction,
    cutting the deposited fiber material layer in between two adjacent ones of the plurality of carrier plates to enable the separation of the carrier plates with the fiber material layer, and
    drying the plurality of carrier plates.

21. A method for depositing a fiber material layer on a carrier, the method comprising
    providing a device for depositing a fiber material layer on a carrier, the device comprising:
        a deposition unit positioned remote from the carrier during operation, the deposition unit being arranged for forming the fiber material layer on the carrier in a continuous manner,
        a carrier feed unit for feeding the carrier in a transport direction with a predetermined speed, wherein the carrier comprises a plurality of carrier plates,
        a cutting unit arranged downstream from the deposition unit, the cutting unit being arranged to cut the deposited fiber material layer in between two adjacent ones of the plurality of carrier plates to enable the separation of the carrier plates with the fiber material layer, and
        a stacking unit positioned downstream from the cutting unit, the stacking unit being arranged to stack adjacent ones of the plurality of carrier plates,
        wherein the stacking unit is configured to stack adjacent ones of the plurality of carrier plates with an inter-stack distance, the inter-stack distance being larger than the sum of a thickness of an individual carrier plate plus a thickness of the fiber material layer;
    feeding the carrier in a transport direction with a predetermined speed, forming the fiber material layer on the carrier in a continuous manner, the carrier moving in the transport direction, cutting the deposited fiber material layer in between two adjacent ones of the plurality of carrier plates to enable the separation of the carrier plates with the fiber material layer, and stacking adjacent ones of the plurality of carrier plates with an inter-stack distance, the inter-stack distance being larger than the sum of a thickness of an individual carrier plate plus a thickness of the fiber material layer.

22. A method for depositing a fiber material layer on a carrier, the method comprising providing a device for depositing a fiber material layer on a carrier, the device comprising:
- a deposition unit positioned remote from the carrier during operation, the deposition unit being arranged for forming the fiber material layer on the carrier in a continuous manner,
- a carrier feed unit for feeding the carrier in a transport direction with a predetermined speed, wherein the carrier comprises a plurality of carrier plates,
- a cutting unit arranged downstream from the deposition unit, the cutting unit being arranged to cut the deposited fiber material layer in between two adjacent ones of the plurality of carrier plates to enable the separation of the carrier plates with the fiber material layer, and
- an inspection unit positioned downstream from the cutting unit, the inspection unit being arranged for inspecting the fiber material layer on individual ones of the plurality of carrier plates,
- wherein the inspection unit is configured to perform a thickness measurement;

feeding the carrier in a transport direction with a predetermined speed, forming the fiber material layer on the carrier in a continuous manner, the carrier moving in the transport direction, cutting the deposited fiber material layer in between two adjacent ones of the plurality of carrier plates to enable the separation of the carrier plates with the fiber material layer, and inspecting the fiber material layer on individual ones of the plurality of carrier plates after the cutting, wherein inspecting comprises the thickness measurement.

23. A method for depositing a fiber material layer on a carrier, the method comprising providing a device for depositing a fiber material layer on a carrier, the device comprising:
- a deposition unit positioned remote from the carrier during operation, the deposition unit being arranged for forming the fiber material layer on the carrier in a continuous manner,
- a carrier feed unit for feeding the carrier in a transport direction with a predetermined speed, wherein the carrier comprises a plurality of carrier plates, and
- a cutting unit arranged downstream from the deposition unit, the cutting unit being arranged to cut the deposited fiber material layer in between two adjacent ones of the plurality of carrier plates to enable the separation of the carrier plates with the fiber material layer,
- wherein the cutting unit is configured to follow the predetermined speed of the moving carrier plates during the cut of the deposited fiber material layer;

feeding the carrier in a transport direction with a predetermined speed, forming the fiber material layer on the carrier in a continuous manner, the carrier moving in the transport direction, and cutting the deposited fiber material layer in between two adjacent ones of the plurality of carrier plates to enable the separation of the carrier plates with the fiber material layer by the cutting unit that follows the predetermined speed of the moving carrier plates during the cut of the deposited fiber material layer.

24. A method for depositing a fiber material layer on a carrier, the method comprising providing a device for depositing a fiber material layer on a carrier, the device comprising:
- a deposition unit positioned remote from the carrier during operation, the deposition unit being arranged for forming the fiber material layer on the carrier in a continuous manner,
- a carrier feed unit for feeding the carrier in a transport direction with a predetermined speed, wherein the carrier comprises a plurality of carrier plates, the transport direction is a linear direction, and the carrier feed unit is configured to feed the carrier in the linear direction, and
- a cutting unit arranged downstream from the deposition unit, the cutting unit being arranged to cut the deposited fiber material layer in between two adjacent ones of the plurality of carrier plates to enable the separation of the carrier plates with the fiber material layer;

feeding the carrier in a linear transport direction with a predetermined speed, forming the fiber material layer on the carrier in a continuous manner, the carrier moving in the linear transport direction, and cutting the deposited fiber material layer in between two adjacent ones of the plurality of carrier plates to enable the separation of the carrier plates with the fiber material layer.

25. A method for depositing a fiber material layer on a carrier, the method comprising providing a device for depositing a fiber material layer on a carrier, the device comprising:
- a deposition unit positioned remote from the carrier during operation, the deposition unit being arranged for forming the fiber material layer on the carrier in a continuous manner,
- a carrier feed unit for feeding the carrier in a transport direction with a predetermined speed, wherein the carrier comprises a plurality of carrier plates, and
- a cutting unit arranged downstream from the deposition unit, the cutting unit being arranged to cut the deposited fiber material layer in between two adjacent ones of the plurality of carrier plates to enable the separation of the carrier plates with the fiber material layer,
- wherein the carrier feed unit further comprises a plurality of rollers, a conveyor belt, or a plurality of sprocket wheels;

feeding the carrier in a transport direction with a predetermined speed by the plurality of rollers, the conveyor belt, or the plurality of sprocket wheels, forming the fiber material layer on the carrier in a continuous manner, the carrier moving in the transport direction, and cutting the deposited fiber material layer in between two adjacent ones of the plurality of carrier plates to enable the separation of the carrier plates with the fiber material layer.

* * * * *